United States Patent
Choi et al.

(10) Patent No.: US 9,217,588 B2
(45) Date of Patent: Dec. 22, 2015

(54) MAGNETIC COOLING APPARATUS AND CONTROL METHOD THEREOF

(71) Applicant: SAMSUNG ELECTRONICS CO., LTD., Suwon-si (KR)

(72) Inventors: Woo Hyek Choi, Yongin-si (KR); Min Soo Kim, Seoul (KR); Il Ju Mun, Suweon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 204 days.

(21) Appl. No.: 13/738,405

(22) Filed: Jan. 10, 2013

(65) Prior Publication Data

US 2013/0180263 A1 Jul. 18, 2013

(30) Foreign Application Priority Data

Jan. 16, 2012 (KR) .................. 10-2012-0004709

(51) Int. Cl.
*F25B 21/00* (2006.01)
*F25B 49/00* (2006.01)

(52) U.S. Cl.
CPC ............ *F25B 21/00* (2013.01); *F25B 49/00* (2013.01); *F25B 2321/0022* (2013.01); *F25B 2321/0023* (2013.01); *Y02B 30/66* (2013.01)

(58) Field of Classification Search
CPC .. F25B 21/00; F25B 49/00; F25B 2321/0022; F25B 2321/0023; Y02B 30/66
USPC ..................................... 62/3.1, 157
See application file for complete search history.

(56) References Cited

U.S. PATENT DOCUMENTS

| | | | | |
|---|---|---|---|---|
| 5,357,756 A | * | 10/1994 | Lubell | 62/3.1 |
| 6,065,944 A | * | 5/2000 | Cobb | 417/394 |
| 6,526,759 B2 | * | 3/2003 | Zimm et al. | 62/3.1 |
| 6,595,004 B1 | * | 7/2003 | Ghoshal | 62/3.1 |
| 7,481,064 B2 | * | 1/2009 | Kitanovski et al. | 62/3.1 |
| 8,429,920 B2 | * | 4/2013 | Duval | 62/3.1 |
| 8,789,378 B2 | * | 7/2014 | Chang et al. | 62/3.1 |

(Continued)

FOREIGN PATENT DOCUMENTS

| | | |
|---|---|---|
| JP | 2005-90921 | 4/2005 |
| JP | 2010-101576 | 5/2010 |

(Continued)

OTHER PUBLICATIONS

Extended European Search Report issued Jul. 25, 2013 in corresponding European Application No. 13151436.6.

(Continued)

*Primary Examiner* — Mohammad M Ali
(74) *Attorney, Agent, or Firm* — Staas & Halsey LLP

(57) ABSTRACT

A magnetic cooling apparatus and a control method thereof are provided. The magnetic cooling apparatus provides a replacement having a simplified structure for motors providing driving force and power transmission systems of reciprocation type and rotation type cooling apparatuses. The magnetic cooling apparatus includes magnets forming a magnetic field, magnetic regeneration units formed of a magnetocaloric material that are provided with coils, and using electromagnetic force, generated when currents are supplied to the coils in the magnetic field, as kinetic energy, and a controller controlling the currents supplied to the coils of the magnetic regeneration units to control moving speeds and directions of the magnetic regeneration units.

13 Claims, 16 Drawing Sheets

(56) References Cited

U.S. PATENT DOCUMENTS

| | | | |
|---|---|---|---|
| 2002/0053209 A1* | 5/2002 | Zimm et al. | 62/3.1 |
| 2003/0051774 A1 | 3/2003 | Saito et al. | |
| 2003/0218852 A1* | 11/2003 | Minovitch | 361/146 |
| 2004/0182086 A1* | 9/2004 | Chiang et al. | 62/3.1 |
| 2005/0120720 A1 | 6/2005 | Fang et al. | |
| 2009/0025611 A1* | 1/2009 | Nagasawa et al. | 106/400 |
| 2009/0178418 A1* | 7/2009 | Wiest et al. | 62/3.1 |
| 2009/0217675 A1 | 9/2009 | Kobayashi et al. | |
| 2009/0308079 A1 | 12/2009 | Lee et al. | |
| 2010/0282129 A1* | 11/2010 | Nagasawa et al. | 106/493 |
| 2010/0300274 A1* | 12/2010 | Root, Jr. | 89/1.814 |
| 2011/0048031 A1* | 3/2011 | Barve et al. | 62/3.1 |
| 2011/0061398 A1* | 3/2011 | Shih et al. | 62/3.1 |
| 2011/0104530 A1* | 5/2011 | Muller et al. | 429/62 |
| 2011/0204733 A1* | 8/2011 | Walsh | 310/37 |
| 2011/0225980 A1* | 9/2011 | Cheng et al. | 62/3.1 |

FOREIGN PATENT DOCUMENTS

| | | |
|---|---|---|
| KR | 10-2004-0062989 | 7/2004 |
| KR | 10-0647852 | 11/2006 |
| KR | 10-0761666 | 10/2007 |
| KR | 10-2009-0049277 | 5/2009 |

OTHER PUBLICATIONS

PCT International Search Report mailed Apr. 22, 2013 in corresponding International Application No. PCT/KR2013/000296.

\* cited by examiner

MAGNETIC COOLING APPARATUS AND CONTROL METHOD THEREOF

CROSS-REFERENCE TO RELATED APPLICATIONS

This application is related to, and claims priority to Korean Patent Application No. 10-2012-0004709, filed on Jan. 16, 2012 in the Korean Intellectual Property Office, the disclosure of which is incorporated herein by reference.

BACKGROUND

1. Field

Embodiments of the present invention relate to a cooling apparatus using a magnetocaloric effect, and method.

2. Description of the Related Art

Cooling apparatuses having a cooling effect by compressing and expanding a gaseous refrigerant, such as chloro fluoro carbon (CFC), are widely used domestically and in industry. However, CFC that may be used as the gaseous refrigerant destroys the ozone layer and causes global warming and is recognized as a major contributor to environmental destruction, and thus new cooling apparatuses to replace these cooling apparatuses using CFCs are desired.

A magnetic cooling apparatus is a cooling apparatus using a magnetocaloric effect. The magnetocaloric effect may be defined as a phenomenon in which the temperature of a magnetic material is raised when a magnetic field is applied to the magnetic material, and is lowered when the magnetic field is removed from the magnetic material. Such a magnetocaloric effect is based on the law of entropy that when the magnetic field is applied to the magnetic material, particles of the magnetic material are arranged. Thus, the temperature of the magnetic material may be raised. When the magnetic field is removed from the magnetic material, arrangement of the particles of the magnetic material may become non-uniform. Thus, the temperature of the magnetic material may be lowered. The magnetic cooling apparatus exhibits a cooling effect using such a temperature difference.

Magnetic cooling apparatuses include a reciprocation type magnetic cooling apparatus in which a magnetic regeneration unit including a magnetic material reciprocates at the inside and the outside of a magnetic field formed by magnets to induce temperature change of a magnetocaloric material, and a rotation type magnetic cooling apparatus in which magnets are rotated, for example, around an annular container provided with a magnetic regeneration unit including a magnetic material installed therein, and thus a change of a magnetic field to the magnetic regeneration unit may be formed to induce a temperature change of a magnetocaloric material in the magnetic regeneration unit.

Magnetic cooling apparatuses may use a motor as a power source to achieve reciprocating motion or rotating motion of the magnetic regeneration unit, and require a power transmission system to convert driving force of the motor into the reciprocating motion or the rotating motion of the magnetic regeneration unit. Therefore, miniaturization of the magnetic cooling apparatuses may be difficult and energy efficiency in driving the magnetic cooling apparatuses may be low.

SUMMARY

It is an aspect of the present invention to provide a magnetic cooling apparatus that replaces motors and power transmission systems of conventional reciprocation type and rotation type cooling apparatuses with a simple structure.

Additional aspects of the invention will be set forth in part in the description which follows and, in part, will be obvious from the description, or may be learned by practice of the invention.

In accordance with an aspect of the present invention, a magnetic cooling apparatus includes magnets forming a magnetic field, magnetic regeneration units formed of a magnetocaloric material, provided with coils, and using electromagnetic force, generated when currents are supplied to the coils in the magnetic field, as kinetic energy, a hot water side flow path formed through a magnetic regeneration unit when the magnetic regeneration unit is magnetized at the inside of the magnetic field, a cold water side flow path formed through a magnetic regeneration unit when the magnetic regeneration unit is demagnetized at the outside of the magnetic field, and a controller controlling current supply to the coils of the magnetic regeneration units so that the magnetic regeneration units are magnetized while passing through the magnetic field and are demagnetized while exiting the magnetic field, and thus controlling movement of the magnetic regeneration units to achieve cooling by temperature lowering generated by demagnetization of the magnetic regeneration units.

The controller may control the moving speeds of the magnetic regeneration units by controlling the intensities of the currents supplied to the coils, and control the moving directions of the magnetic regeneration units by controlling the direction of the current supplied to the coils.

The controller may control the intensities and directions of the currents so as to generate sufficient electromagnetic force to overcome attractive force of the magnets when the magnetic regeneration units exit the magnetic field.

The controller may control the intensities and directions of the currents so as to generate braking force of an intensity corresponding to attractive force of the magnets when the magnetic regeneration units enter the magnetic field.

The controller may control the intensities and directions of the currents so that the magnetic regeneration units rectilinearly reciprocate between the outside and the inside of the magnetic field.

The controller may control the intensities and directions of the currents so that the magnetic regeneration units rotate between the outside and the inside of the magnetic field.

In accordance with an aspect of the present invention, a control method of a magnetic cooling apparatus that has magnets forming a magnetic field, magnetic regeneration units formed of a magnetocaloric material, provided with coils, and using electromagnetic force, generated when currents are supplied to the coils in the magnetic field, as kinetic energy, a hot water side flow path formed through one magnetic regeneration unit when the magnetic regeneration unit is magnetized inside of the magnetic field, and a cold water side flow path formed through a magnetic regeneration unit when the magnetic regeneration unit is demagnetized outside of the magnetic field, includes controlling current supply to the coils of the magnetic regeneration units so that the magnetic regeneration units are magnetized while passing through the magnetic field, controlling current supply to the coils of the magnetic regeneration units so that the magnetic regeneration units are demagnetized while exiting the magnetic field, and controlling movement of the magnetic regeneration units to achieve cooling by temperature lowering generated by demagnetization of the magnetic regeneration units.

The intensities and directions of the currents may be controlled so as to generate sufficient electromagnetic force to overcome attractive force of the magnets when the magnetic regeneration units exit the magnetic field.

The intensities and directions of the currents may be controlled so as to generate braking force of an intensity corresponding to attractive force of the magnets when the magnetic regeneration units enter the magnetic field.

The intensities and directions of the currents supplied to the coils may be controlled so that the magnetic regeneration units rectilinearly reciprocate between the outside and the inside of the magnetic field.

The intensities and directions of the currents supplied to the coils may be controlled so that the magnetic regeneration units rotate between the outside and the inside of the magnetic field.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1A:
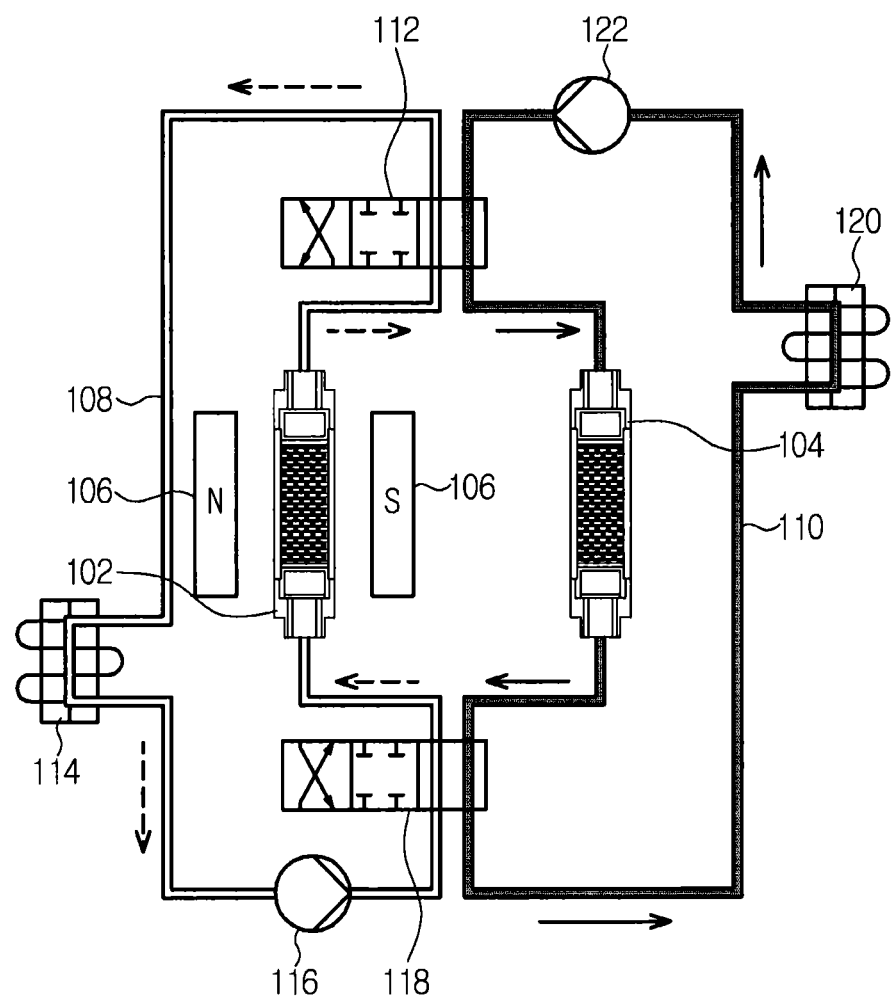
FIGS. 1A and 1B illustrate a magnetic cooling apparatus in accordance with an embodiment of the present invention.

Reference will now be made in detail to the embodiments of the present invention, examples of which are illustrated in the accompanying drawings, wherein like reference numerals refer to like elements throughout.

Figure 1B:
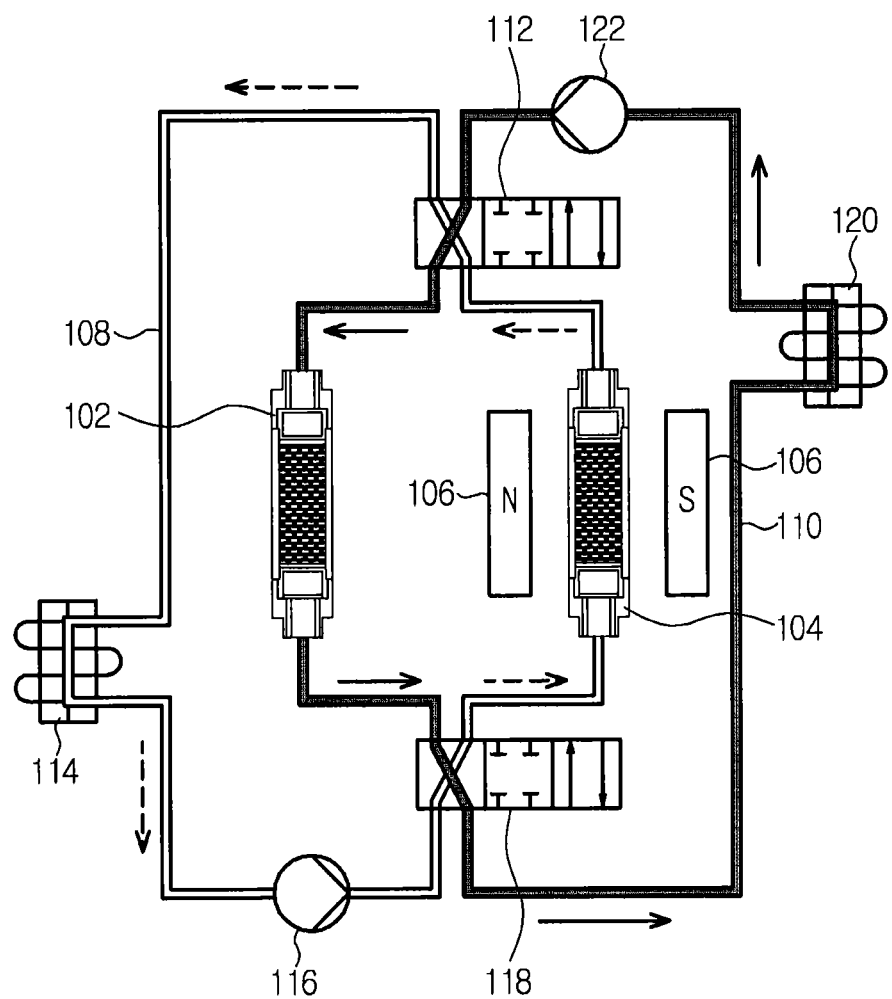

FIGS. 1A and 1B illustrate a magnetic cooling apparatus in accordance with an embodiment of the present invention. FIG. 1A illustrates a first magnetic regeneration unit 102, a second magnetic regeneration unit 104, and a pair of magnets 106 having N and S poles. The first magnetic regeneration unit 102 and the second magnetic regeneration unit 104 may be active magnetic regenerators. The first magnetic regeneration unit 102 and the second magnetic regeneration unit 104 may be controlled so as to alternately enter and exit a magnetic field formed between the N and S pole magnets 106. The first magnetic regeneration unit 102 and the second magnetic regeneration unit 104 may be magnetized inside of the magnetic field, and the first magnetic regeneration unit 102 and the second magnetic regeneration unit 104 may be demagnetized outside of the magnetic field. When the first magnetic regeneration unit 102 enters the magnetic field, and is magnetized, the second magnetic regeneration unit 104 exits the magnetic field and is demagnetized. When the first magnetic regeneration unit 102 exits the magnetic field and is demagnetized, the second magnetic regeneration unit 104 enters the magnetic field and is magnetized. To achieve entry/exit of the first magnetic regeneration unit 102 and the second magnetic regeneration unit 104 into/from the magnetic field, a method (reciprocation type) of reciprocating the first magnetic regeneration unit 102 and the second magnetic regeneration unit 104 and a method (rotation type) of rotating the first magnetic regeneration unit 102 and the second magnetic regeneration unit 104 may be used.

The first magnetic regeneration unit 102 may be provided on a high temperature side flow path 108, and the second magnetic regeneration unit 104 may be provided on a low temperature side flow path 110. The second magnetic regeneration unit 104 may be disposed on the high temperature side flow path 108, and the first magnetic regeneration unit 102 may be disposed on the low temperature side flow path 110. A high temperature side valve 112, a high temperature side heat exchanger 114 and a high temperature side pump 116 with the first magnetic regeneration unit 102 may be provided on the high temperature side flow path 108. In a similar manner to the high temperature side flow path 108, a low temperature side valve 118, a low temperature side heat exchanger 120 and a low temperature side pump 122 together with the second magnetic regeneration unit 103 may be provided on the low temperature side flow path 110. The high temperature side valve 112 and the low temperature side valve 118 intersect the high temperature side flow path 108 and the low temperature side flow path 110 at points of time when the first magnetic regeneration unit 102 and the second magnetic regeneration unit 104 are respectively magnetized and demagnetized. That is, if the first magnetic regeneration unit 102 is magnetized and the second magnetic regeneration unit 104 is demagnetized, as illustrated in FIG. 1A, the high temperature side flow path 108 may be formed through the magnetized first magnetic regeneration unit 102 so that a fluid flows along the high temperature side flow path 108, and the low temperature side flow path 110 may be formed through the demagnetized second magnetic regeneration unit 104 so that the fluid flows along the low temperature side flow path 110. If the first magnetic regeneration unit 102 is demagnetized and the second magnetic regeneration unit 104 is magnetized, as illustrated in FIG. 1B, the low temperature side flow path 110 may be formed through the demagnetized first magnetic regeneration unit 102 so that the fluid flows along the low temperature side flow path 110, and the high temperature side flow path 108 may be formed through the magnetized second magnetic regeneration unit 104 so that the fluid flows along the high temperature side flow path 108. The high temperature side flow path 108 may be formed at the magnetized magnetic regeneration unit and the low temperature side flow path 110 may be formed at the demagnetized magnetic regeneration unit by the function of the high temperature side valve 112 and the low temperature side valve 118. Thus, the flow direction of the fluid during cooling (during demagnetization) and the flow direction of the fluid during heating (during magnetization) are always uniform at the high temperature side heat exchanger 114 and the low temperature side heat exchanger 120. The high temperature side heat exchanger 114 and the low temperature side heat exchanger 120 allow a cooling effect and a heating effect generated during magnetization and demagnetization of the first magnetic regeneration unit 102 and the second magnetic regeneration unit 104 to be used in heating and cooling. The high temperature side pump 116 and the low temperature side pump 122 forcibly circulate the fluid along the high temperature side flow path 108 and the low temperature side flow path 110 through a pumping function. Accordingly, the magnetic cooling apparatus may acquire a high temperature and a low temperature using the heating/cooling function of the first magnetic regeneration unit 102 and the second magnetic regeneration unit 104.

Figure 2:
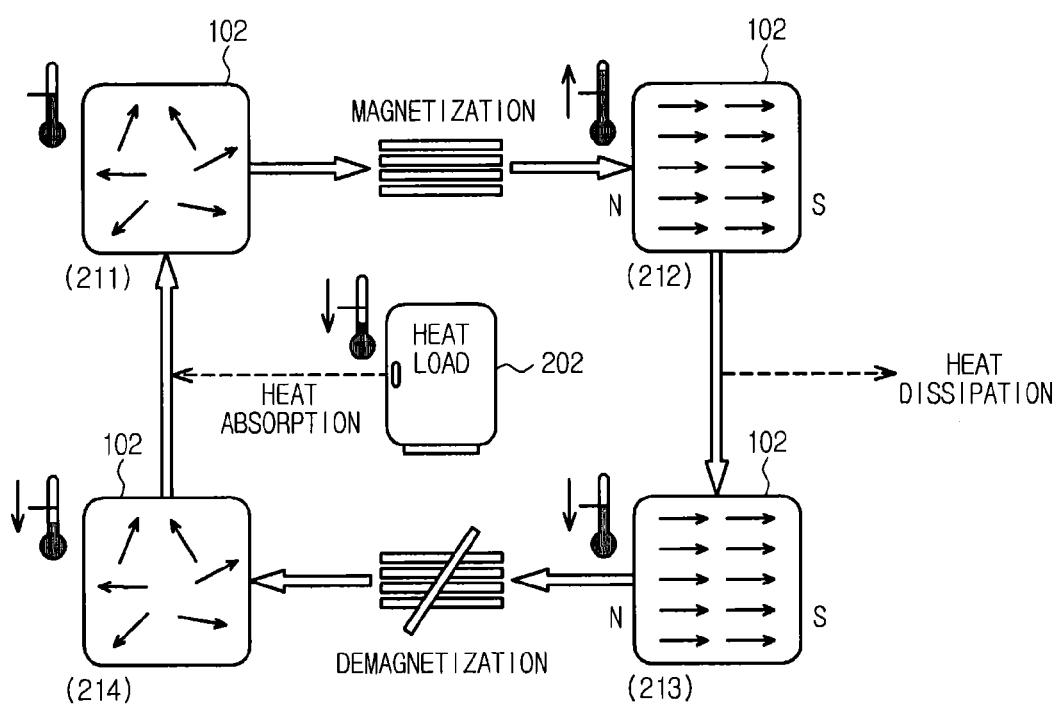
FIG. 2 illustrates an exemplary cooling cycle of a magnetic cooling apparatus.

FIG. 2 illustrates an exemplary cooling cycle of the magnetic cooling apparatus illustrated in FIG. 1. As illustrated in FIG. 2, for example, when the first magnetic regeneration unit 102 is magnetized by forming a magnetic field using the magnets 106 having the N and S poles, as illustrated in FIG. 1B, in a state where the first magnetic regeneration unit 102 is not magnetized, as illustrated in 210, heat generation occurs, when heat of the first magnetic regeneration unit 102 is discharged in the state 211, the temperature of the first magnetic regeneration unit 102 is slightly lowered and reaches a state of 212, and when the magnetic field is removed and thus the first magnetic regeneration unit 102 is demagnetized, the temperature of the first magnetic regeneration unit 102 may be rapidly lowered and a desired low temperature is acquired. A heat load 202 is cooled using such a low temperature. The low temperature may be continuously acquired by repeating the operations of 211 to 214.

Figure 3:
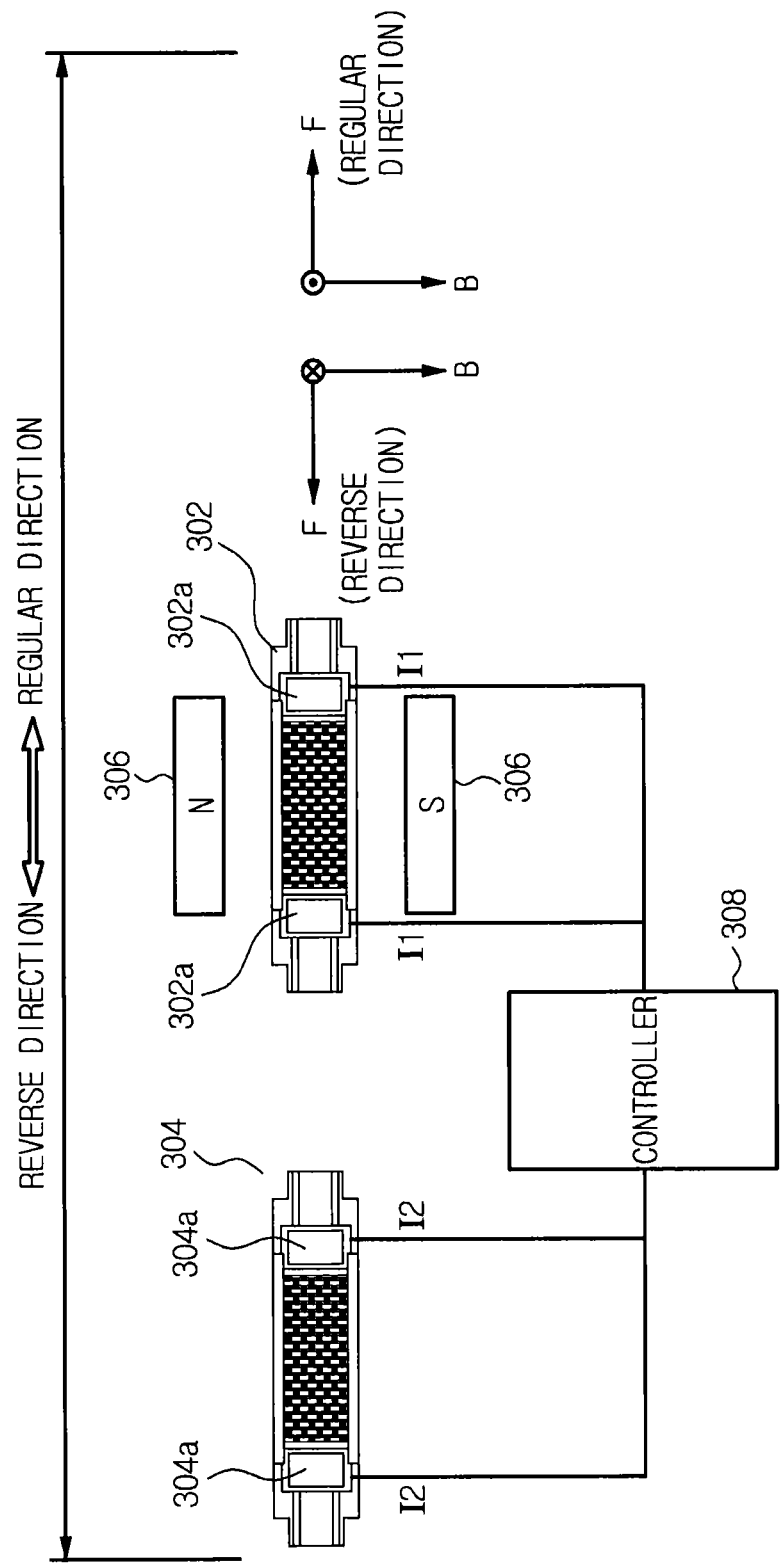
FIG. 3 illustrates an exemplary reciprocation type magnetic cooling apparatus.

FIG. 3 illustrates a reciprocation type magnetic cooling apparatus as an embodiment of the magnetic cooling apparatus illustrated in FIG. 1. The reciprocation type magnetic cooling apparatus illustrated in FIG. 3 has a first magnetic regeneration unit 302 and a second magnetic regeneration unit 304 reciprocate on a straight line of a designated section and alternately repeat entry and exit, into and from, a magnetic field generated by magnets 306. That is, when the first magnetic regeneration unit 302 and the second magnetic regeneration unit 304 move to the right of FIG. 3 (defined as the regular direction), the first magnetic regeneration unit 302 exits the magnetic field (is demagnetized) and the second magnetic regeneration unit 304 enters the magnetic field (is magnetized). When the first magnetic regeneration unit 302 and the second magnetic regeneration unit 304 move to the left of FIG. 3 (defined as the reverse direction), the second magnetic regeneration unit 304 exits the magnetic field (is demagnetized) and the first magnetic regeneration unit 302 enters the magnetic field (is magnetized). The first magnetic regeneration unit 302 and the second magnetic regeneration unit 304 illustrated in FIG. 3 correspond to the first magnetic regeneration unit 102 and the second magnetic regeneration unit 104 illustrated in FIG. 1.

In FIG. 3, first coils 302a are installed at both sides of the first magnetic regeneration unit 302, and second coils 304a are installed at both sides of the second magnetic regeneration unit 304. The first coils 302a of the first magnetic regeneration unit 302 and the second coils 304a of the second magnetic regeneration unit 304 cause the first magnetic regeneration unit 302 and the second magnetic regeneration unit 304 to rectilinearly reciprocate in the regular direction and the reverse direction. When current I1 or I2 is supplied to the first coils 302a or the second coils 304a, under the condition that the first magnetic regeneration unit 302 or the second magnetic regeneration unit 304 enters the magnetic field, force moving the first magnetic regeneration unit 302 or the second magnetic regeneration unit 304 in the regular or reverse direction occurs by an electromagnetic force generated due to supply of current and magnetic force generated by the magnets 306. Such force allows the first magnetic regeneration unit 302 and the second magnetic regeneration unit 304 to reciprocate on the straight line in the regular or reverse direction. In order to reciprocate the first magnetic regeneration unit 302 and the second magnetic regeneration unit 304 on the straight line by force generated by supplying current I1 or I2 to the first coils 302a or the second coils 304a in the magnetic field, the first coils 302a may be fixed integrally to the first magnetic regeneration unit 302, and the second coils 304a may be fixed integrally to the second magnetic regeneration unit 304. The first magnetic regeneration unit 302 and the second magnetic regeneration unit 304 may be mechanically combined so that, when one of the first magnetic regeneration unit 302 and the second magnetic regeneration unit 304 moves, the other moves.

The moving directions of the first magnetic regeneration unit 302 and the second magnetic regeneration unit 304 may be determined according to the directions (polarities) of current I1 and current I2 supplied to the first coils 302a and the second coils 304a when the direction of the magnetic field is the same. The moving speeds of the first magnetic regeneration unit 302 and the second magnetic regeneration unit 304 may be determined according to the intensities of current I1 and current I2. A controller 308 controls the moving directions of the first magnetic regeneration unit 302 and the second magnetic regeneration unit 304 by controlling the directions (polarities) of current I1 and current I2 supplied to the first coils 302a and the second coils 304a, and controls the moving speeds of the first magnetic regeneration unit 302 and the second magnetic regeneration unit 304 by controlling the intensities of current I1 and current I2.

Figure 4:
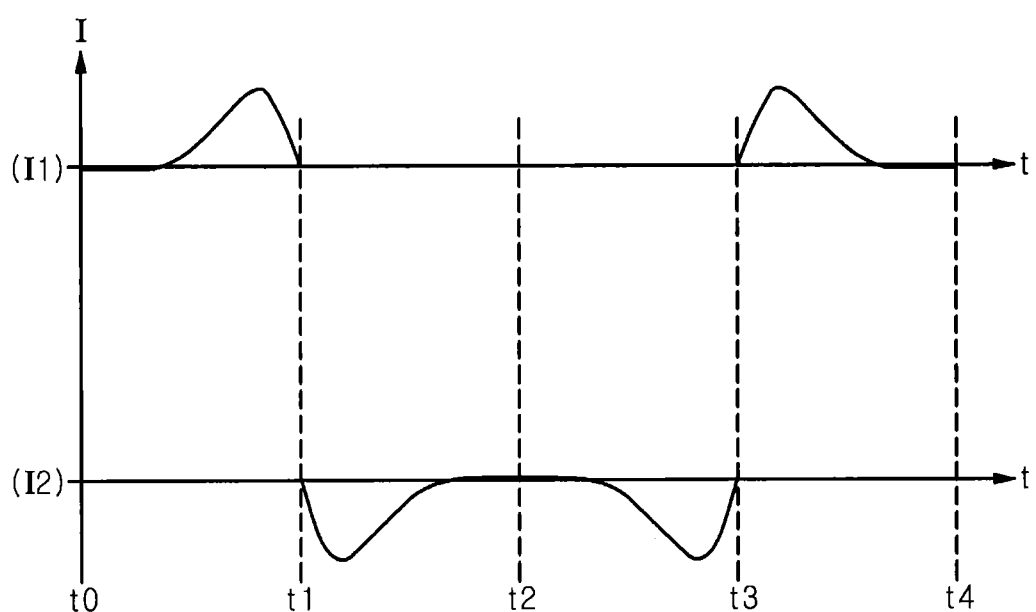
FIG. 4 illustrates exemplary current profiles supplied to magnetic regeneration units of an exemplary reciprocation type magnetic cooling apparatus.

FIG. 4 illustrates exemplary current profiles supplied to the magnetic regeneration units of the reciprocation type magnetic cooling apparatus illustrated in FIG. 3. FIGS. 5A to 5E illustrate an exemplary operating cycle of the reciprocation type magnetic cooling apparatus driven by the current profiles illustrated in FIG. 4. That is, the controller 308 illustrated in FIG. 3 controls the directions (polarities) and intensities of the current I1 and current I2 according to the current profiles, as illustrated in FIG. 4, and thus executes operation of the magnetic cooling apparatus, as illustrated in FIGS. 5A to 5E. Rectilinearly reciprocating motion of the first magnetic regeneration unit 302 and the second magnetic regeneration unit 304 of the reciprocation type magnetic cooling apparatus in accordance with the embodiment of the present invention are disclosed.

t0: Initial State and Starting in a Regular Direction

Figure 5A:
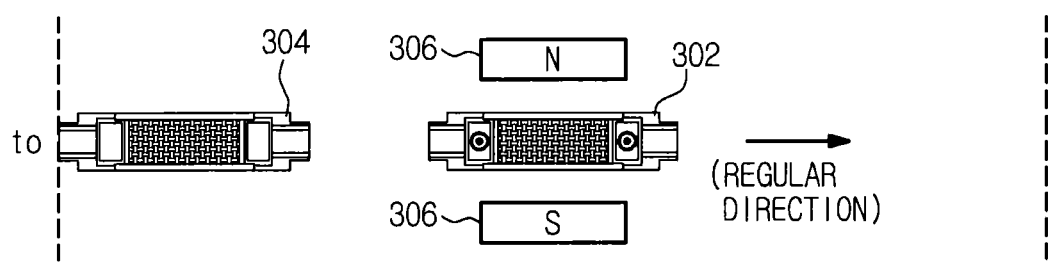
FIGS. 5A to 5E illustrate an exemplary operating cycle of a reciprocation type magnetic cooling apparatus driven by the exemplary current profiles illustrated in FIG. 4.

In the initial state, the first magnetic regeneration unit 302 may be located inside of the magnetic field formed by the magnets 306, and the second magnetic regeneration unit 304 may be outside of the magnetic field formed by the magnets 306, as illustrated in FIG. 5A. When current I1 in section t0-t1 of FIG. 4 is supplied to the first coils 302a of the first magnetic regeneration unit 302 in the initial state, the first magnetic regeneration unit 302 and the second magnetic regeneration unit 304 start to move in the regular direction by electromagnetic force. Through such movement in the regular direction, the first magnetic regeneration unit 302 exits the magnetic field formed by the magnets 306 and the second magnetic regeneration unit 304 enters the magnetic field formed by the magnets 306. Current supplied to the first coils 302a has a sufficient intensity to allow the first magnetic regeneration unit 302 to exit the magnetic field against attractive force of the magnets 306, and has a direction (polarity) to move the first magnetic regeneration unit 302 in the regular direction so that the second magnetic regeneration unit 304 may enter the magnetic field.

t1: Braking in a Regular Direction

Figure 5B:
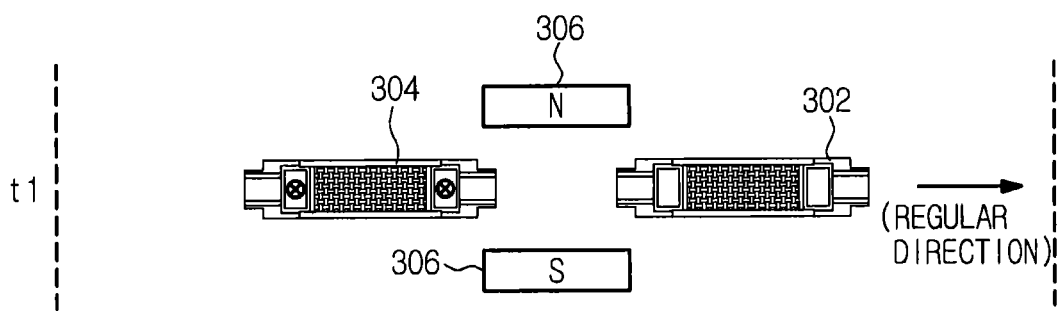

At a time when the first magnetic regeneration unit 302 exits the magnetic field, the second magnetic regeneration unit 304 enters the magnetic field, as illustrated in FIG. 5B. At a time when the second magnetic regeneration unit 304 enters the magnetic field, the moving speed of the second magnetic regeneration unit 304 in the regular direction may be rapidly increased by attractive force of the magnets 306. Therefore, force moving the second magnetic regeneration unit 304 in the reverse direction is generated and offsets the affect of the attractive force of the magnets 306, and thus braking force in the regular direction causing the second magnetic regeneration unit 304 to enter the magnetic field while maintaining the original speed thereof without the affect of the attractive force of the magnets 306 is generated. As illustrated in section t1-t2 of FIG. 4, current I2, having an intensity and a direction (polarity) to cause the second magnetic regeneration unit 304 to enter the magnetic field formed by the magnets 306 at the originally intended speed without the affect of the attractive force of the magnets 306 within the magnetic field while continuously moving in the regular direction, is supplied to the second magnetic regeneration unit 304.

t2: Stop and Starting in a Reverse Direction

Figure 5C:
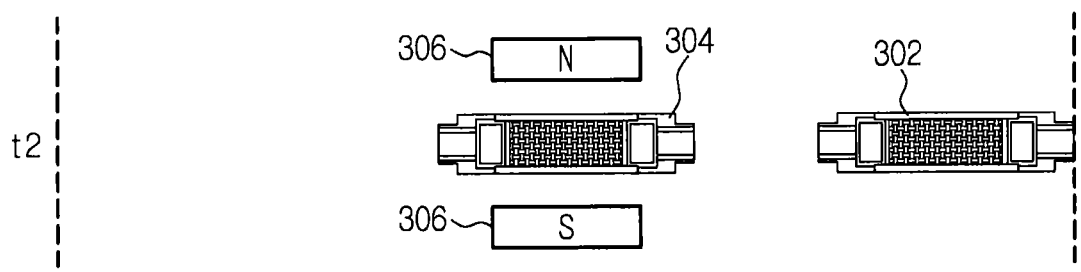

The intensity of current I2 supplied to the second magnetic regeneration unit 304 in a designated section about a point t2 of time of FIG. 2 may be extremely low (almost 0). This prevents the second magnetic regeneration unit 304 from passing by the magnetic field while moving in the regular direction. Thereby, the second magnetic regeneration unit 304 may stop at the central portion of the magnets 306. When the second magnetic regeneration unit 304 moved inside of the magnetic field is located at the central portion of the magnets 306, as illustrated in FIG. 5C, the intensity of current I2 supplied to the second coils 304a of the second magnetic regeneration unit 304 is increased (section t2-t3 of FIG. 4) so as to move the second magnetic regeneration unit 304 in the reverse direction. As illustrated in FIG. 4, current I2 in section t1-t2 serves to brake the second magnetic regeneration unit 304, and current I2 in section t2-t3 serves to start the second magnetic regeneration unit 304 in the reverse direction (i.e., to change the moving direction of the second magnetic regeneration unit 304).

t3: Braking in a Reverse Direction

Figure 5D:
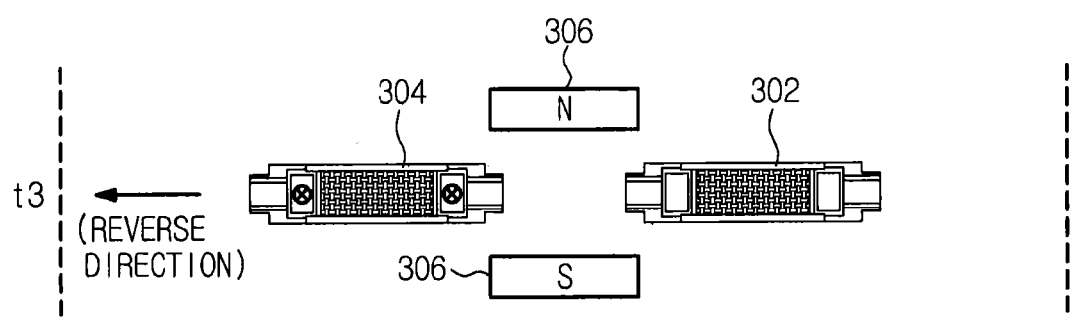

At a time when the second magnetic regeneration unit 304 moves in the reverse direction and exits the magnetic field formed by the magnets 306, the first magnetic regeneration unit 302 enters the magnetic field, as illustrated in FIG. 5D. At a time when the first magnetic regeneration unit 302 enters the magnetic field, the moving speed of the first magnetic regeneration unit 302 in the reverse direction may be rapidly increased by attractive force of the magnets 306. Therefore, a force moving the first magnetic regeneration unit 302 in the regular direction may be generated and offsets the affect of the attractive force of the magnets 306, and thus a braking force in the reverse direction causing the first magnetic regeneration unit 302 to enter the magnetic field while maintaining the original speed thereof without the affect of the attractive force of the magnets 306 is generated. As illustrated in section t3-t4 of FIG. 4, current I1 having intensity and direction (polarity) to cause the first magnetic regeneration unit 302 to enter the magnetic field formed by the magnets 306 at the originally intended speed without the affect of the attractive force of the magnets 306 within the magnetic field while moving in the reverse direction may be supplied to the first magnetic regeneration unit 302.

t4: Stop

Figure 5E:
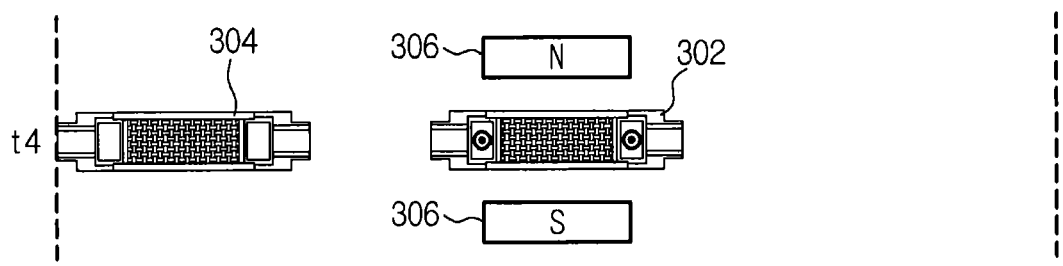

The intensity of current I1 supplied to the first magnetic regeneration unit 302 at the end of section t3-t4 of FIG. 4 may be decreased to almost 0. This prevents the first magnetic regeneration unit 302 from passing by the magnetic field while moving in the reverse direction. Thereby, the first magnetic regeneration unit 302 stops at the central portion of the magnets 306, as illustrated in FIG. 5E, and one cycle of the rectilinearly reciprocating motion of the first magnetic regeneration unit 302 and the second magnetic regeneration unit 304 is completed. If it is desired to continue to execute the rectilinearly reciprocating motion of the first magnetic regeneration unit 302 and the second magnetic regeneration unit 304 illustrated in FIGS. 5A to 5E, current supply illustrated in section t0-t4 of FIG. 4 is continuously repeated.

Through the rectilinearly reciprocating motion, as illustrated in FIG. 4 and FIGS. 5A to 5E, the first magnetic regeneration unit 302 and the second magnetic regeneration unit 304 alternately repeat entry and exit into and from the magnetic field formed by the magnets 306 and are thus magnetized and demagnetized, thereby executing heating and cooling. According to an exemplary embodiment of the present invention, the rectilinearly reciprocating motion of the first magnetic regeneration unit 302 and the second magnetic regeneration unit 304 may be achieved by installing the first coils 302a and the second coils 304a at the first magnetic regeneration unit 302 and the second magnetic regeneration unit 304 and controlling the directions (polarities) and intensities of currents supplied to the first coils 302a and the second coils 304a. Thus, an effective replacement is provided for motors used as power sources of the reciprocating motion and power transmission systems of conventional magnetic regeneration units, the magnetic cooling apparatus may be reduced in size, and energy efficiency increased during driving of the magnetic cooling apparatus.

Figure 6:
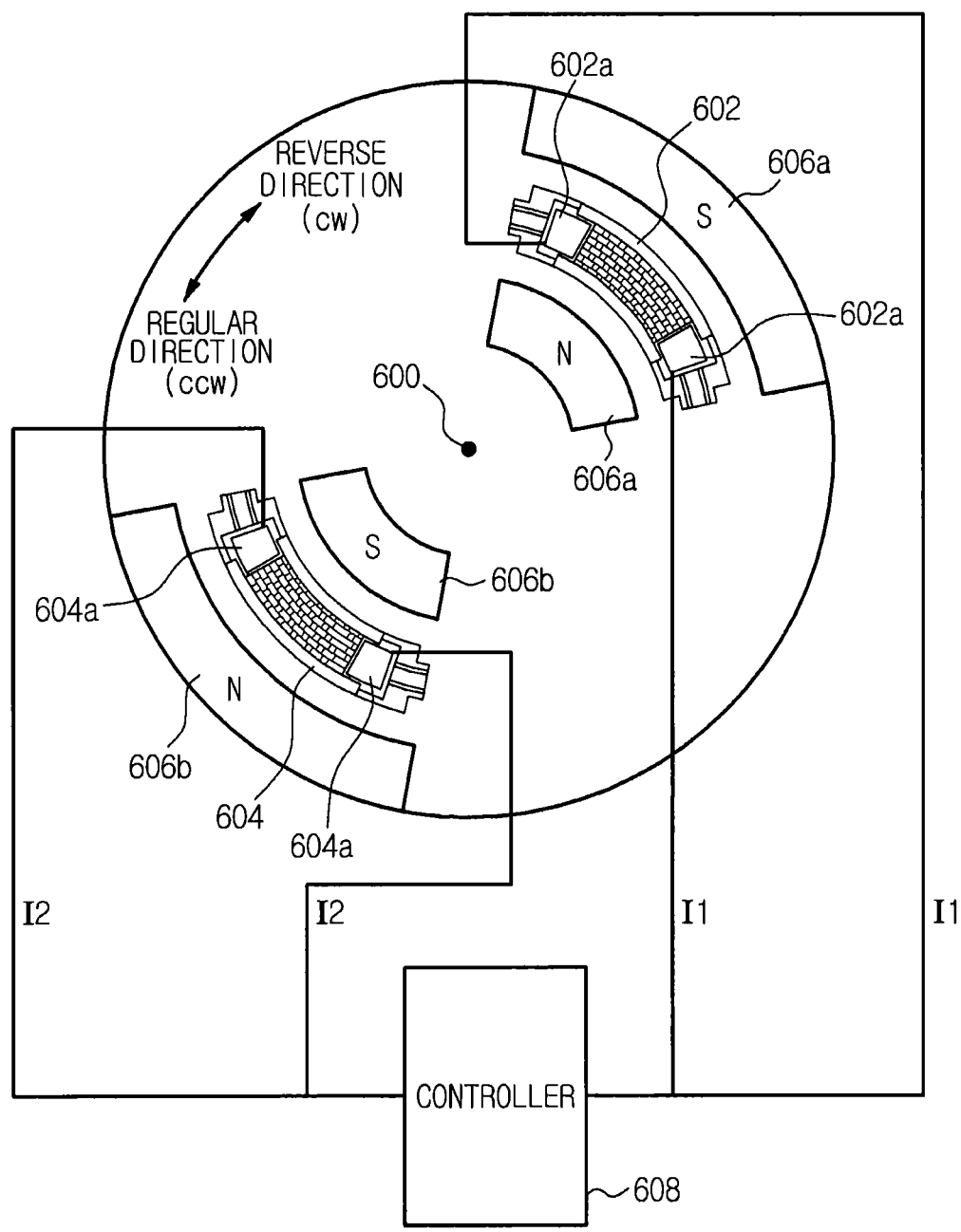
FIG. 6 illustrates a rotation type magnetic cooling apparatus illustrated.

FIG. 6 illustrates a rotation type magnetic cooling apparatus as an exemplary embodiment of the magnetic cooling apparatus illustrated in FIG. 1. The rotation type magnetic cooling apparatus illustrated in FIG. 6 has a first magnetic regeneration unit 602 and a second magnetic regeneration unit 604 that are rotated in the counterclockwise (CCW) direction (defined as the regular direction) about a rotary shaft 600 and alternately repeat entry, and exit into, and from, magnetic fields generated by first magnets 606a and second magnets 606b. That is, when the first magnetic regeneration unit 602 and the second magnetic regeneration unit 604 enter the magnetic fields formed by the first magnets 606a and the second magnets 606b, the first magnetic regeneration unit 602 and the second magnetic regeneration unit 604 are magnetized, and when the first magnetic regeneration unit 602 and the second magnetic regeneration unit 604 exit the magnetic fields formed by the first magnets 606a and the second magnets 606b, the first magnetic regeneration unit 602 and the second magnetic regeneration unit 604 are demagnetized. The first magnetic regeneration unit 602 and the second magnetic regeneration unit 604 illustrated in FIG. 6 correspond to the first magnetic regeneration unit 102 and the second magnetic regeneration unit 104 illustrated in FIG. 1.

In FIG. 6, first coils 602a may be installed at both sides of the first magnetic regeneration unit 602, and second coils 604a may be installed at both sides of the second magnetic regeneration unit 604. The first coils 602a of the first magnetic regeneration unit 602 and the second coils 604a of the second magnetic regeneration unit 604 serve to cause the first magnetic regeneration unit 602 and the second magnetic regeneration unit 604 to be rotated in the regular (CCW) direction. When current is supplied to the first coils 602a or the second coils 604a under the condition that the first magnetic regeneration unit 602 and the second magnetic regeneration unit 604 enter the magnetic fields, force moving the first magnetic regeneration unit 602 and the second magnetic regeneration unit 604 in the regular (CCW) direction is generated by the function of electromagnetic force generated due to supply of current and magnetic force generated by the first magnets 606a and the second magnets 606b. Such force allows the first magnetic regeneration unit 602 and the second magnetic regeneration unit 604 to be rotated in the regular (CCW) direction. If the direction (polarity) of current is changed, force moving the first magnetic regeneration unit 602 and the second magnetic regeneration unit 604 in the clockwise (CW) direction (defined as the reverse direction) may be generated. In order to rotate the first magnetic regeneration unit 602 and the second magnetic regeneration unit 604 by force generated by supplying current I1 and current I2 to the first coils 602a and the second coils 604a, the first coils 602a are fixed integrally to the first magnetic regeneration unit 602, and the second coils 604a are fixed integrally to the second magnetic regeneration unit 604.

The rotating direction of the first magnetic regeneration unit 602 and the second magnetic regeneration unit 604 may be determined according to the directions (polarities) of current I1 and current I2 supplied to the first coils 602a and the second coils 604a when the directions of the magnetic fields are the same. Further, the rotating speed of the first magnetic regeneration unit 602 and the second magnetic regeneration unit 604 is determined according to the intensities of current I1 and current I2. A controller 608 controls the rotating direction of the first magnetic regeneration unit 602 and the second magnetic regeneration unit 604 by controlling the directions (polarities) of current I1 and current I2 supplied to the first coils 602a and the second coils 604a, and controls the rotating speed of the first magnetic regeneration unit 602 and the second magnetic regeneration unit 604 by controlling the intensities of current I1 and current I2.

Figure 7:
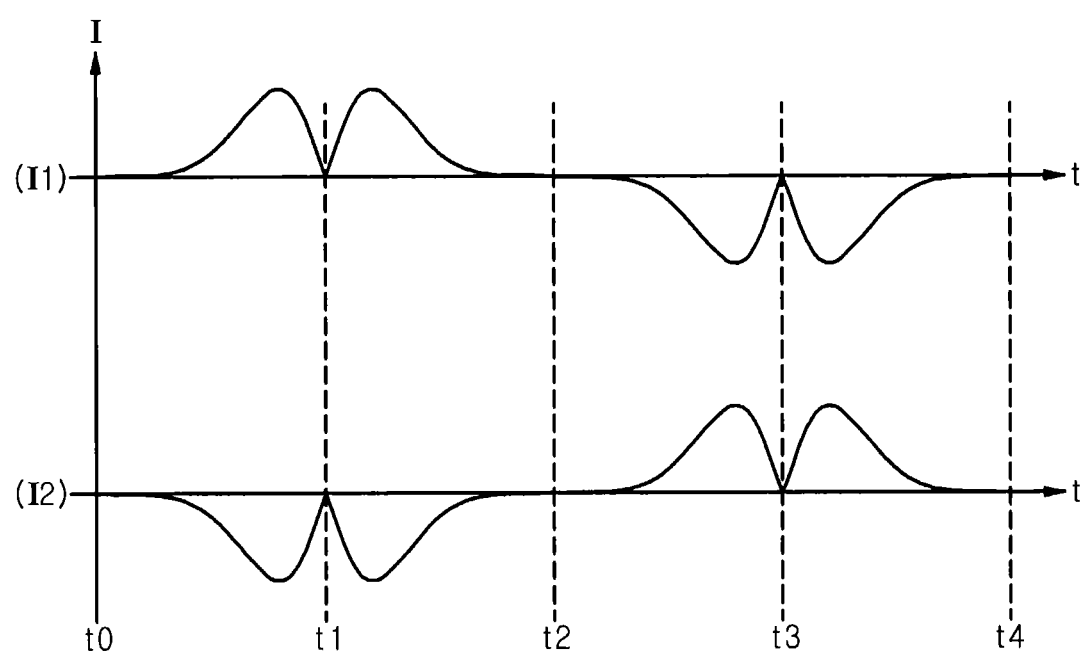
FIG. 7 illustrates exemplary current profiles supplied to magnetic regeneration units of a rotation type magnetic cooling apparatus illustrated in FIG. 6.

FIG. 7 illustrates current profiles supplied to the magnetic regeneration units of the rotation type magnetic cooling apparatus illustrated in FIG. 6. FIGS. 8A to 8D illustrate an exemplary operating cycle of the rotation type magnetic cooling apparatus driven by the current profiles illustrated in FIG. 7. That is, the controller 608 illustrated in FIG. 6 controls the directions (polarities) and intensities of the current I1 and current I2 according to the current profiles, as illustrated in FIG. 7, and thus executes operation of the magnetic cooling apparatus, as illustrated in FIGS. 8A to 8D. As illustrated in FIG. 6, since the first magnets 606a and the second magnets 606b face each other across the rotary shaft 600, the first magnets 606a and the second magnets 606b may be disposed such that the positions of the N and S poles of the first magnets 606a and the positions of the N and S poles of the second magnets 606b are opposite to each other. The direction of the magnetic field formed by the first magnets 606a and the direction of the magnetic field formed by the second magnets 606b are opposite to each other. Therefore, the direction (polarity) of current supplied to the magnetic regeneration unit (for example, the first magnetic regeneration unit 602) within the magnetic field formed by the first magnets 606a and the direction (polarity) of current supplied to the magnetic regeneration unit (for example, the second magnetic regeneration unit 604) within the magnetic field formed by the second magnets 606b should be opposite to each other. To prevent eccentricity generated when the first magnetic regeneration unit 602 and the second magnetic regeneration unit 604 are rotated, the intensities of the currents supplied to the first magnetic regeneration unit 602 and the second magnetic regeneration unit 604 may have small errors. As illustrated in the current profiles of FIG. 7, the current supplied to the first coils 602a of the first magnetic regeneration unit 602 and the current supplied to the second coils 604a of the second magnetic regeneration unit 604 have opposite directions (polarities), and have equal intensity. A rotating motion of the first magnetic regeneration unit 602 and the second magnetic regeneration unit 604 of the rotation type magnetic cooling apparatus in accordance with an exemplary embodiment of the present invention are disclosed.

t0: Initial State and First Starting in a Regular Direction

Figure 8A:
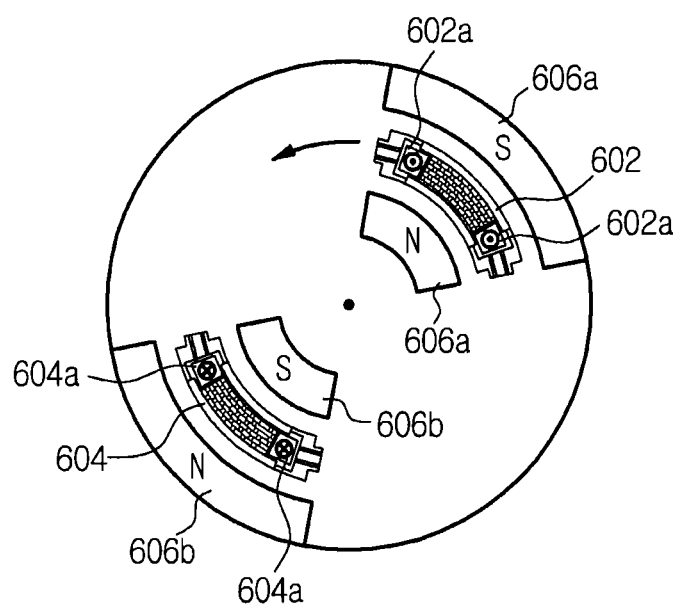
FIGS. 8A to 8D illustrate an exemplary operating cycle of the rotation type magnetic cooling apparatus driven by the exemplary current profiles illustrated in FIG. 7.

In the initial state, the first magnetic regeneration unit 602 is located inside of the magnetic field formed by the first magnets 606a, and the second magnetic regeneration unit 604 is located inside of the magnetic field formed by the second magnets 606b, as illustrated in FIG. 8A. When current I1 in section t0-t1 of FIG. 7 is supplied to the first coils 602a of the first magnetic regeneration unit 602 and current I2 in section t0-t1 of FIG. 7 is supplied to the second coils 604a of the second magnetic regeneration unit 604 in such an initial state, the first magnetic regeneration unit 602 and the second magnetic regeneration unit 604 start to be rotated in the regular (CCW) direction by electromagnetic force. The currents supplied to the first coils 602a and the second coils 602b have sufficient intensities to allow the first magnetic regeneration unit 602 and the second magnetic regeneration unit 604 to exit the magnetic fields against attractive force of the first magnets 606a and the second magnets 606b. Through such rotation, the first magnetic regeneration unit 602 exits the magnetic field formed by the first magnets 606a and is rotated toward the second magnets 606b, and the second magnetic regeneration unit 304 exits the magnetic field formed by the second magnets 606b and is rotated toward the first magnets 606a.

t1: First Braking in a Regular Direction

Figure 8B:
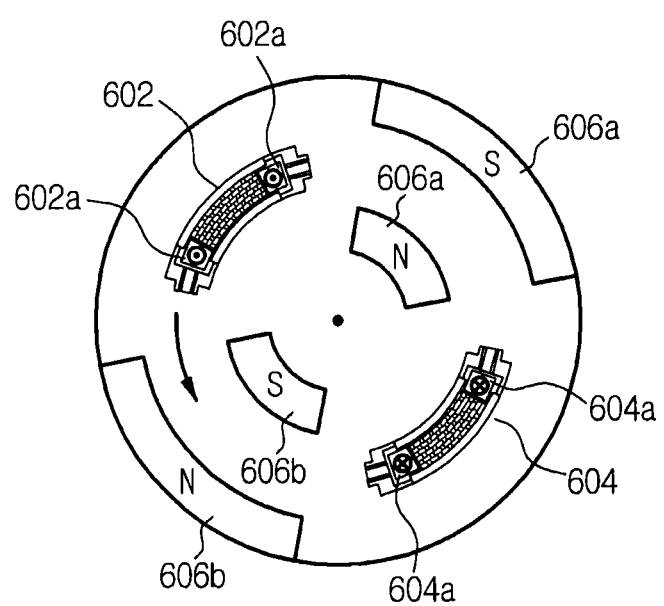

At a time when the first magnetic regeneration unit 602 approaches the second magnets 606b and the second magnetic regeneration unit 604 approaches the first magnets 606a, as illustrated in FIG. 8B, current supply to the first magnetic regeneration unit 602 and the second magnetic regeneration unit 604 is momentarily stopped, and currents I1 and I2 in section t1-t2 of FIG. 7 are resupplied to the first coils 602a and the second coils 604a. At a time when the first magnetic regeneration unit 602 and the second magnetic regeneration unit 604 enter the magnetic field formed by the second magnets 606b and the magnetic field formed by the first magnets 606a, the rotating speeds of the first magnetic regeneration unit 602 and the second magnetic regeneration unit 604 in the regular direction may be rapidly increased by attractive force of the second magnets 606b and attractive force of the first magnets 606a. Therefore, forces moving the first magnetic regeneration unit 602 and the second magnetic regeneration unit 604 in the reverse direction may be generated by supply of currents I1 and I2 in section t1-t2 of FIG. 7, and offset the affect of the attractive force of the first magnets 606a and the attractive force of the second magnets 606b, and thus braking forces in the regular direction causing the first magnetic regeneration unit 602 and the second magnetic regeneration unit 604 to enter the magnetic fields while maintaining the original speeds thereof without the affect of the attractive force of the second magnets 606b and the attractive force the first magnets 606a may be generated. In FIG. 7, since the currents I1 and I2 in section t0-t1 and the currents I1 and I2 in section t1-t2 have equal direction (polarity), but the directions of the magnetic fields applied to the first magnetic regeneration unit 602 and the second magnetic regeneration unit 604 in section t0-t1, and the directions of the magnetic fields applied to the first magnetic regeneration unit 602, and the second magnetic regeneration unit 604 in section t1-t2, are opposite to each other, the directions of forces applied to the first magnetic regeneration unit 602 and the second magnetic regeneration unit 604 in section t0-t1, and the directions of forces applied to the first magnetic regeneration unit 602 and the second magnetic regeneration unit 604 in section t1-t2 are opposite to each other, and thus braking forces offsetting the affect of the attractive force of the first magnets 606a and the attractive force of the second magnets 606b may be generated. The currents I1 and I2 supplied to the first magnetic regeneration unit 602 and the second magnetic regeneration unit 604 have intensities and directions (polarities), to cause the first magnetic regeneration unit 302 and the second magnetic regeneration unit 304 to enter different (new) magnetic fields at the originally intended speeds without the affect of the attractive force of the first magnets 606a and the attractive force of the second magnets 606b within the different (new) magnetic fields while continuously moving in the regular direction.

t2: Second Starting in a Regular Direction

Figure 8C:
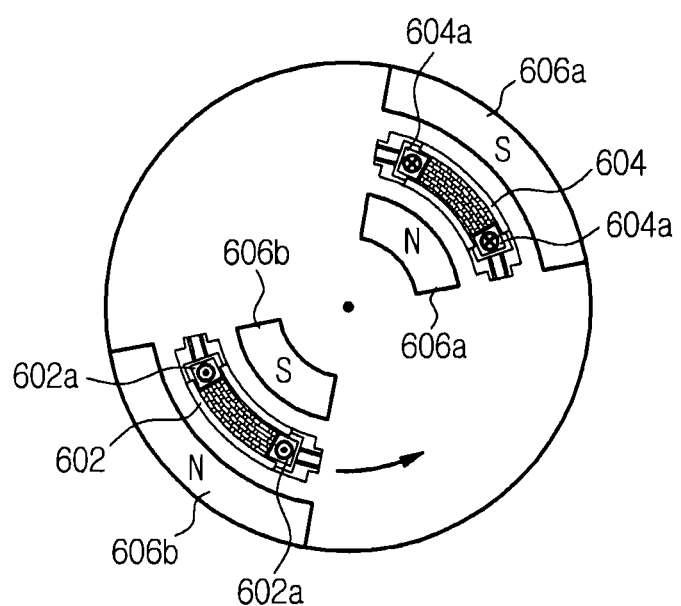

Intensities of currents I1 and I2 supplied to the first magnetic regeneration unit 602 and the second magnetic regeneration unit 604 in a designated section about a point t2 of time of FIG. 4 are extremely low (almost 0). This prevents the first magnetic regeneration unit 602 and the second magnetic regeneration unit 604 from passing by the magnetic fields at an excessively high speed while being rotated in the regular direction. When the first magnetic regeneration unit 602 and the second magnetic regeneration unit 604 are respectively located at the central portions of the second magnets 606b and the first magnets 606a, as illustrated in FIG. 8C, current I1 in section t2-t3 of FIG. 7 is supplied to the first coils 602a of the first magnetic regeneration unit 602 and current I2 in section t2-t3 of FIG. 7 is supplied to the second coils 604a of the second magnetic regeneration unit 604. The first magnetic regeneration unit 602 and the second magnetic regeneration unit 604 are continuously rotated in the regular direction by electromagnetic force, and the first magnetic regeneration unit 602 and the second magnetic regeneration unit 604 may exit the magnetic field formed by the second magnets 606b and the magnetic field formed by the first magnets 606a by such rotation. Currents supplied to the first coils 602a and the second coils 604a have intensities causing the first magnetic regeneration unit 602 and the second magnetic regeneration unit 604 to exit the magnetic fields against attractive force of the second magnets 606b and attractive force of the first magnets 606a, and have directions (polarities) continuously rotating the first magnetic regeneration unit 602 and the second magnetic regeneration unit 604 in the regular direction.

t3: Second Braking in a Regular Direction

Figure 8D:
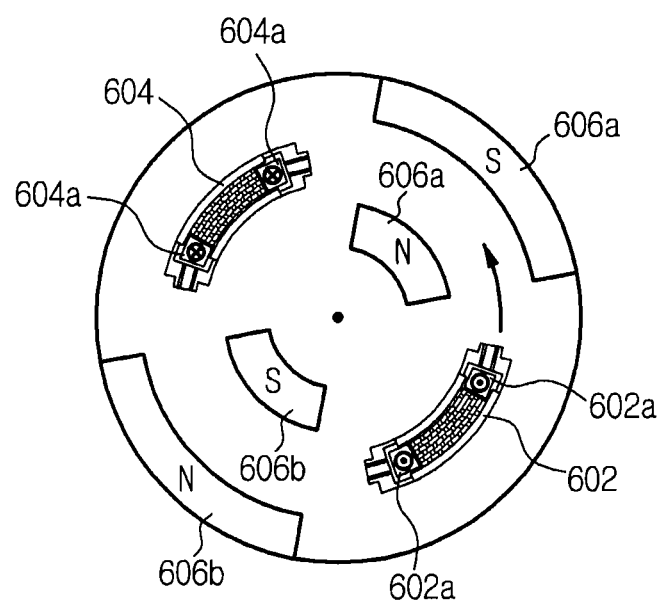

When the first magnetic regeneration unit 602 exits the magnetic field formed by the second magnets 606b and again approaches the first magnets 606a and the second magnetic regeneration unit 604 exits the magnetic field formed by the first magnets 606a and again approaches the second magnets 606b, as illustrated in FIG. 8D, current supply to the first magnetic regeneration unit 602 and the second magnetic regeneration unit 604 is momentarily stopped, and then currents I1 and I2 in section t3-t4 of FIG. 7 are resupplied to the first coils 602a and the second coils 604a. At about the time when the first magnetic regeneration unit 602 and the second magnetic regeneration unit 604 enter the magnetic field formed by the first magnets 606a and the magnetic field formed by the second magnets 606b, the rotating speeds of the first magnetic regeneration unit 602 and the second magnetic regeneration unit 604 in the regular direction may be rapidly increased by attractive force of the first magnets 606a and attractive force of the second magnets 606b. Therefore, forces rotating the first magnetic regeneration unit 602 and the second magnetic regeneration unit 604 in the reverse direction are generated by supply of currents I1 and I2 in section t3-t4 of FIG. 7, and offset the affect of the attractive force of the first magnets 606a and the attractive force of the second magnets 606b, and thus braking forces in the regular direction causing the first magnetic regeneration unit 602 and the second magnetic regeneration unit 604 to enter the magnetic fields while maintaining the original speeds thereof without the affect of the attractive force of the first magnets 606a and the second magnets 606b, are generated. In FIG. 7, since the currents I1 and I2 in section t2-t3 and the currents I1 and I2 in section t3-t4 have equal direction (polarity), but the directions of the magnetic fields applied to the first magnetic regeneration unit 602, and the second magnetic regeneration unit 604 in section t2-t3, and the directions of the magnetic fields applied to the first magnetic regeneration unit 602 and the second magnetic regeneration unit 604 in section t3-t4 are opposite to each other, the directions of forces applied to the first magnetic regeneration unit 602 and the second magnetic regeneration unit 604 in section t2-t3 and the directions of forces applied to the first magnetic regeneration unit 602 and the second magnetic regeneration unit 604 in section t3-t4 are opposite to each other, and thus braking forces offsetting the affect of the attractive force of the first magnets 606a and the attractive force of the second magnets 606b are generated. The currents I1 and I2 supplied to the first magnetic regeneration unit 602 and the second magnetic regeneration unit 604 have the intensities and directions (polarities) to cause the first magnetic regeneration unit 302, and the second magnetic regeneration unit 304 to enter, different (new) magnetic fields at the originally intended speeds without the affect of the attractive force of the first magnets 606a and the attractive force of the second magnets 606b within the different (new) magnetic fields while continuously moving in the regular direction.

t4: Stop

Intensities of currents I1 and I2 supplied to the first magnetic regeneration unit 602 and the second magnetic regeneration unit 604 at the end of section t3-t4 of FIG. 7 may be decreased to almost 0. This prevents the first magnetic regeneration unit 602 and the second magnetic regeneration unit 604 from passing by the magnetic fields while being rotated. Thereby, the first magnetic regeneration unit 602 stops at the central portion of the first magnets 606a, as illustrated in FIG. 8A, and one cycle of the rotating motion of the first magnetic regeneration unit 602 and the second magnetic regeneration unit 604 is completed. To continue to execute the rotating motion of the first magnetic regeneration unit 602 and the second magnetic regeneration unit 604 illustrated in FIGS. 8A to 8D, current supply illustrated in section t0-t4 of FIG. 7 may be continuously repeated.

Through a rotating motion, as illustrated in FIG. 7 and FIGS. 8A to 8D, the first magnetic regeneration unit 602 and the second magnetic regeneration unit 604 alternately repeat entry and exit, into and from, the magnetic field formed by the first magnets 606a and the magnetic field formed by the second magnets 606b and are thus magnetized and demagnetized, thereby executing heating and cooling. During such a process, the rotating motion of the first magnetic regeneration unit 602 and the second magnetic regeneration unit 604 may be achieved by installing the first coils 602a and the second coils 604a at the first magnetic regeneration unit 602 and the second magnetic regeneration unit 604 and controlling the directions (polarities) and intensities of currents supplied to the first coils 602a and the second coils 604a. Thus, motors used as power sources of the reciprocating motion and power transmission systems of the conventional magnetic regeneration units may effectively be replaced, the magnetic cooling apparatus miniaturized, and energy efficiency increased during driving of the magnetic cooling apparatus.

A magnetic cooling apparatus in accordance with an embodiment of the present invention may replace motors providing driving force and power transmission systems of conventional reciprocation type and rotation type cooling apparatuses with a simplified structure, thus have a smaller size and increased energy efficiency during driving of the magnetic cooling apparatus.

Although a few embodiments of the present invention have been illustrated and described, it would be appreciated by those skilled in the art that changes may be made in these embodiments without departing from the principles and spirit of the invention, the scope of which is defined in the claims and their equivalents.

What is claimed is:

1. A magnetic cooling apparatus comprising:
   a plurality of magnets forming a magnetic field;
   a magnetic regeneration unit, provided with a magnetocaloric material and coils, the magnetic regeneration unit configured to move by using an electromagnetic force as kinetic energy, wherein the electromagnetic force is generated by interaction between the magnetic field and currents flowing on the coils when the magnetic regeneration unit passes through the magnetic field formed by the magnet; and
   a controller controlling current supply to the coils of the magnetic regeneration unit so that the magnetic regeneration unit is magnetized while passing through the magnetic field and demagnetized while exiting the magnetic field, and thus controlling movement of the magnetic regeneration unit to achieve cooling by temperature lowering generated by demagnetization of the magnetic regeneration unit.

2. The magnetic cooling apparatus according to claim 1, wherein the controller:
   controls the moving speeds of the magnetic regeneration unit by controlling the intensities of the currents supplied to the coils; and
   controls the moving directions of the magnetic regeneration unit by controlling the directions of the currents supplied to the coils.

3. The magnetic cooling apparatus according to claim 2, wherein the controller controls the intensities and directions of the currents so as to generate sufficient electromagnetic force to overcome attractive force of the magnets when the magnetic regeneration unit exit the magnetic field.

4. The magnetic cooling apparatus according to claim 2, wherein the controller controls the intensities and directions of the currents so as to generate braking force of an intensity corresponding to attractive force of the magnets when the magnetic regeneration unit enter the magnetic field.

5. The magnetic cooling apparatus according to claim 1, wherein the controller controls the intensities and directions of the currents so that the magnetic regeneration unit rectilinearly reciprocate between the outside and the inside of the magnetic field.

6. The magnetic cooling apparatus according to claim 1, wherein the controller controls the intensities and directions of the currents so that the magnetic regeneration unit rotates between the outside and the inside of the magnetic field.

7. The magnetic cooling apparatus according to claim 1, further comprises:
   a hot water side flow path formed through the magnetic regeneration unit when the magnetic regeneration unit is magnetized inside of the magnetic field; and
   a cold water side flow path formed through the magnetic regeneration unit when the magnetic regeneration unit is demagnetized outside of the magnetic field.

8. A control method of a magnetic cooling apparatus which has magnets forming a magnetic field, a magnetic regeneration unit provided with a magnetocaloric material and coils, the magnetic regeneration unit configured to move by using an electromagnetic force as kinetic energy, wherein the electromagnetic force is generated by interaction between the magnetic field and currents flowing on the coils when the magnetic regeneration unit passes through the magnetic field formed by the magnet, the control method comprising:
   controlling current supply to the coils of the magnetic regeneration unit so that the magnetic regeneration unit is magnetized while passing through the magnetic field;
   controlling current supply to the coils of the magnetic regeneration unit so that the magnetic regeneration unit is demagnetized while exiting the magnetic field; and
   controlling movement of the magnetic regeneration units to achieve cooling by temperature lowering generated by demagnetization of the magnetic regeneration unit.

9. The control method according to claim 8, wherein the intensities and directions of the currents are controlled so as to generate sufficient electromagnetic force to overcome attractive force of the magnets when the magnetic regeneration unit exit the magnetic field.

10. The control method according to claim 8, wherein the intensities and directions of the currents are controlled so as to generate braking force of an intensity corresponding to attractive force of the magnets when the magnetic regeneration unit enter the magnetic field.

11. The control method according to claim 8, wherein the intensities and directions of the currents supplied to the coils are controlled so that the magnetic regeneration unit rectilinearly reciprocate between the outside and the inside of the magnetic field.

12. The control method according to claim 8, wherein the intensities and directions of the currents supplied to the coils are controlled so that the magnetic regeneration unit rotate between the outside and the inside of the magnetic field.

13. A control method of a cooling device which has magnets forming a magnetic field, a magnetic regeneration unit provided with a magnetocaloric material and coils, the magnetic regeneration unit configured to move by using an electromagnetic force as kinetic energy, wherein the electromagnetic force is generated by interaction between the magnetic field and currents flowing on the coils when the magnetic regeneration unit passes through the magnetic field formed by the magnet, the method comprising:
   controlling a current supply so that a magnetic regeneration unit is magnetized while passing through a magnetic field and demagnetized while exiting the magnetic field; and
   controlling a movement of the magnetic regeneration unit to achieve cooling by lowering a temperature generated by demagnetization of the magnetic regeneration unit.

* * * * *